Patented Oct. 31, 1950

2,527,579

UNITED STATES PATENT OFFICE 2,527,579

HEMOSTATIC AGENT AND PREPARATION THEREOF

Adrien Schoch, Berne, Switzerland, assignor, by mesne assignments, to Gibone Anstalt, Vaduz, Liechtenstein, a corporation of Liechtenstein No Drawing. Application April 26, 1945, Serial No. 590,522. In Switzerland May 20, 1944

4 Claims. (Cl. 167—74)

The present invention relates to hemostatic agents. It is well known that various method of extracting animal cells and tissues yield substances which accelerate the coagulation of blood. Numerous names are in use for such substances, such as Thrombokinase, gymoplastic substance, Cytocym, Thromboplastin, Thrombocyn, Thrombokinin and others. So far, no definite information is available as to the chemical nature of these substances. According to the present state of knowledge it is most probable that the known blood coagulators are complex combinations of lipoids (f. i. kephalin) with other components as yet unknown. All the known substances of this type act as coagulation accelerators, and their efficiency is dependent on calcium as a catalyst.

Blood coagulators of the type described have been prepared from blood, from lung tissue, from tumors of the thyroid gland (struma) and also from Thymus or Placenta. It has also been proposed to obtain blood coagulators from animal brain tissue (see Quick, Journ. of biolog. Chem. 114, vol. 2, 1936, Wöhlisch, "Fortschritte in de Physiologie der Blutgerinnung," in Ergebnisse der Physiol. vol. 43, 1940, ps. 174 ff.), but these compounds have been used only for the determination of the coagulation factors of blood outside of the body, that is for the quantitative measuring of the Prothrombine in the plasma, and therefore as diagnostic agents.

Such diagnostic agents are obtained, for instance, by preparing from fresh rabbit brains, without previous extraction, a dried paste which for use is converted into an aqueous emulsion, or by extracting brain tissue with acetone or alcohol.

It was also known (see Mellanby, Journ. of Physiol. 38, 28, 1909; Ferguson and Erickson, Proc. Sec. exper. Biol. a. Med. 40, 625, 1939) that the presence of albuminous matter tends to interfere with the efficiency of coagulation accelerating cell substances and that the latter can be freed from albumin, for instance by the action of trypsin.

All the known blood coagulation-accelerating substances known show the disadvantage that they are not water soluble but form only aqueous suspensions, which are thermo-unstable and, therefore, cannot be sterilized by heating. Another substantial disadvantage of the known blood coagulating agents is that they cannot be employed for intravenous injections, because aside from the technical difficulty of injecting suspensions intravenously, the ever present danger of blood clot formation renders the intravenous injection of blood coagulating agents impossible.

According to the present invention, a hemostatic agent free of these disadvantages and, in the form of its aqueous solutions, suitable for intravenous injection, is obtained by a process comprising the following steps:

Fresh animal brain matter is converted to an aqueous paste which is extracted with ether to remove the fatty components. The remainder is macerated in water for a period of the order of about 48 hours whereby, due to the action of the proteolytic ferments present in the brain matter, the hemostatic active substance is split off from the complex albumin compositions. Finally, the albumins are precipitated and separated from the solution, and the latter is evaporated to dryness, the active hemostatic agent being obtained in the form of a dry, yellow-white, clear water-soluble powder.

It is possible to use alcohol or acetone to precipitate the albumins, such alcohol or acetone being subsequently driven off during the evaporation.

The product obtained by this process is distinguished from the previously known blood coagulators principally by its thermostability and by the fact that its aqueous solutions may be injected intravenously and intramuscularly, because its hemostatic effects are not due to nor accompanied by an acceleration of the blood coagulation beyond the normal rate. Furthermore, the new product is clear-soluble in water, free of albumin and, on account of its heat stability adapted to be sterilized. It is stable in dried and powdered form and may be stored as an aqueous solution in ampullas without losing its efficiency. It may also be employed as a dusting powder.

The new preparation is mixed for purposes of injection with a substance free of albumin and which does not cause any shocks. Thus, the hemostatic agent may be mixed with pectin and the mixture may be dissolved in a solution of an alkali metal citrate, such as sodium citrate, the latter being employed with advantage because it prevents coagulation of the blood at the point of injection.

A suitable mixture may contain 10 to 20 parts by weight of pectin to 100 parts by weight of the new preparation in a solution containing 5% of sodium citrate.

*Example*

The brain of cattle is completely liberated from any adhering blood by rinsing it in water, then it is cut into small pieces, mixed with some physiological solution of sodium chloride and stirred in an electric stirrer for three hours to form a paste. 100 grams of this paste are mixed with 200 ccm. of ether and agitated in an agitator for 2 hours whereupon the mixture is permitted to settle during 48 hours at 5° C. The ether fraction containing the free fats dissolved therein is then removed by decanting and is rejected. The aqueous remainder is heated on the water bath to free it completely of ether, then mixed with twice its quantity of water, agitated and left to settle for 48 hours at 5° C. During this maceration, the hemostatic-active substance of the brain is split off from the complex albumin compositions due to the action of the proteolytic ferments present in the brain matter. Next, the macerated product is treated with acetone by adding 110 ccm. of acetone per each 200 ccm. of extract, and then the whole is heated to boiling temperature, whereby the albumins are precipitated. The precipitate is separated from the liquid by a short centrifuging. The remaining liquid is evaporated at 40° C. to dryness. The dried sterile product, which is obtained in the form of an albumin-free, yellow-white, clear water-soluble powder, constitutes the active hemostatic agent. It may be stored as a 1% solution in a 0.9% aqueous sodium chloride solution in sterile ampullas.

For the purpose of an intravenous injection, for instance, 100 mg. of the dry active substance are mixed with 10 to 20 mg. pectin and the mixture is dissolved in a 5% aqueous solution of sodium citrate. This solution is used for the injection. It has been found that such a solution, after an intravenous injection, acts rapidly to minimize or terminate the bleeding.

What I claim is:

1. A process of producing an active thermostable hemostatic agent which is suitable for intravenous injection, said process comprising the steps of converting fresh animal brain matter into an aqueous paste, extracting said paste with ether to eliminate the fatty components, macerating the residue with water for a period of the order of about 48 hours whereby the active hemostatic agent is split off from the complex albumin compositions due to the action of the proteolytic ferments present in the brain matter, causing precipitation of the albumins, separating the albumins from the fluid containing the active hemostatic agent, and evaporating the remaining fluid to dryness.

2. A process of producing an active thermostable hemostatic agent which is suitable for intravenous injection, said process comprising the steps of freeing fresh animal brain matter from adhering blood, comminuting the brain matter, mixing it with a physiological solution of sodium chloride, stirring it to form an aqueous paste, mixing 100 grams of said paste with about 200 ccm. of ether, agitating the mixture for several hours, permitting the mixture to settle for a period of about 48 hours at a temperature of about 5° C., removing the ether fraction containing the free fats dissolved therein, adding water to the residue and agitating for a short period, permitting the mixture to settle at about 5° C. for a period of the order of about 48 hours to effect a splitting off of the active hemostatic agent from the complex albumin compositions due to the action of the proteolytic ferments present in the brain matter, adding to the macerated substance an albumin precipitating agent, removing the precipitated albumin, and evaporating the remaining fluid to dryness at about 40° C.

3. A thermostable hemostatic agent in the form of an albumin-free, yellow-white, clear water-soluble powder solutions of which are suitable for intravenous injection, said agent being obtained by converting fresh animal brain matter into an aqueous paste, extracting said paste with ether to eliminate the fatty components, macerating the residue with water for a period of the order of about 48 hours whereby the active hemostatic agent is split off from the complex albumin composition due to the action of the proteolytic ferments present in the brain matter, causing precipitation of the albumins, separating the albumins from the fluid containing the active hemostatic agent, and evaporating the remaining fluid to dryness.

4. A process of producing thermostable hemostatic agents suitable for intravenous injection comprising converting fresh brain substance into an aqueous paste, extracting the paste with ether, separating the ether from the residue, macerating the residue with water for a period of the order of about 48 hours whereby the active hemostatic agent is split off from the complex brain substance and dissolved in the water, adding acetone thereby forming a precipitate, and removing the precipitate from the aqueous solution of the hemostatic agent.

ADRIEN SCHOCH.

REFERENCES CITED

The following references are of record in the file of this patent:

UNITED STATES PATENTS

| Number | Name | Date |
|---|---|---|
| Re. 16,639 | Mills | May 31, 1927 |
| 2,162,863 | Ripke et al. | June 20, 1939 |
| 2,349,316 | Volle | May 23, 1944 |
| 2,408,535 | Smith | Oct. 1, 1946 |

FOREIGN PATENTS

| Number | Country | Date |
|---|---|---|
| 349,257 | Great Britain | May 28, 1931 |

OTHER REFERENCES

Quick, "The Hemorrhagic Diseases" (1942), pages 64–68, 72, 73.

Poncher, "The Relative Stability and Potency of Thromboplastins for Prothrombin Tests" in the Journal of Laboratory and Clinical Medicine, No. 27, Dec. 1941, pages 385–391.

Am. J. Physiol., 114, 1936, Thromboplastin, by A. J. Quick, pages 285 and 286.